Patented Nov. 11, 1952

2,617,729

UNITED STATES PATENT OFFICE 2,617,729

PROCESS OF MANUFACTURE OF A COMPLEX FOOD COMPOSITION CONTAINING NITROGEN, PHOSPHORUS AND CALCIUM AND PRODUCTS OBTAINED

Adolphe Pacault, Paris, France

No Drawing. Application December 27, 1949, Serial No. 135,296. In France December 21, 1948

7 Claims. (Cl. 99—18)

This invention relates to the manufacture of a complex food composition containing nitrogen, phosphorus and calcium, prepared by the association of a protein with the combination of phosphorus and calcium to form phosphoproteinate of calcium. The product may be utilized for human food, as an additional material, or as a jellifying agent. The product may be mixed with molasses and chopped straw, or like ingredients, to form a reconstituted feed for animals.

It is known in the prior art to extract from degreased bones, refuse of new skin or refuse from tanneries a portion of their protein matters in the form of glue or of gelatine, by treating the raw material with boiling water rendered alkaline by soda or lime if desired, or even by water heated to above 100° C. by use of an autoclave. The broths obtained can, after evaporation, be transformed into a protein substance which is sometimes used in food, at least as an additional substance or as a jellification means. Unfortunately the taste and odor of these known prior products, often disagreeable, restricts the use of them and the absence of any useful element other than nitrogen limits their value as food.

It has been found in accordance with the present invention, that one can obtain in the use of these refuse materials an inodorous composition and one without marked taste, containing appreciable proportions of phosphorus and calcium capable of assimilation, that is, elements of the muscular system as well as elements of the osseous or boney system. This product is referred to herein as phosphoproteinate of calcium.

The method of operating consists in the following operations which will be precisely stated quantitatively by further examples.

I. *Jellification.*—Skins and refuse of skin of any origin whatever, raw, chamoised, or tanned, after treating with lime if desired, are subjected to the action of a bath of boiling water slightly alkalinized by soda, or better by lime. It is agitated during the whole period of putting in the hydrolytic solution.

II. *Deodorization.*—At the end of a period of time which could be from one hour to five hours according to the origin, the age, or the degree or any possible tanning the heating is interrupted, and into the liquid, still at least warm, there is added an adsorbent charcoal finely divided (animal black, active carbon) while maintaining a slight agitation for several minutes. The adsorption of all of the odorous materials is accompanied by a possible partial discoloration, and the filtration leaves a broth clear and slightly calcic.

III. *Phosphatation.*—The lime present is neutralized by the phosphoric acid which precipitates it more or less completely. The amount of acid is in general greater than that which is necessary to transform all the calcium into monoacid phosphate ($CaHPO_4$). This amount is determined by the quantity of phosphorus and of calcium to be incorporated into the final product, according to the demand of the customer. The dose of acid can be as much as the weight of the protein and its amino-acid products of hydrolysis passed into solution.

Whenever there is an excess of acid—this is the normal case—with reference to the amount of calcium brought by the initial broth, one reverses the reaction by the addition of pulverized calcium carbonate or precipitated calcium carbonate in such a way as to transform all the phosphorus into monoacid phosphate ($CaHPO_4$).

IV. *The final conditioning.*—The broth which then presents the appearance of a more or less thick milk is kept constantly in agitation in order to avoid the deposition of calcium phosphate and it is sent into a vacuum evaporator, comprised either of rotating heated cylinders or of atomizers, which apparatus is well-known. The broth is then transformed into a light, white powder, which is less hygroscopic than one which does not contain precipitated calcium phosphate.

Moreover the material can be re-dissolved in a dilute solution of phosphoric acid containing pepsin according to the prescriptions of the pharmacopeia, and by heating to 40° C. to transform the protein into peptones. The operation terminated, one neutralizes with calcium carbonate and evaporates in vacuum, which gives a peptone in powder form containing phosphorus and calcium in assimilable form.

In a variant of the process, the protein or the peptone containing the useful mineral elements can be incorporated in molasses and if desired also in chopped straw, in order to make a reconstituted feed for animals.

As an example of the invention, one will operate in the following manner: Into an open tank of 6 cubic meters, at least half filled with water, will be added 60 to 100 kgs. of recently pulverized quicklime, according to the raw material to be treated. The liquid will be brought up to 100° C. by external heating or by the injection of steam, and then only, will one add to it by portions, while stirring, a ton of refuse of skins, preferably previously put through a chopper. This adding will go on for 2 to 3 hours, in general, and the temperature of 100° C. will be maintained for a period varying with the condition of the skins, but which can extend during the length of time of the loading.

Sometimes this operation will have to be performed in an autoclave; for example, when dealing with skins that are too dry or too heavily tanned, but it is not recommended to go beyond the temperature of 120° C. under penalty of having the hydrolysis carried too far.

Sometimes, on the contrary, with fragile raw materials it will be beneficial to reduce or even to suppress the alkalization of the liquid by the lime.

According to the material used, the broth a little diluted by the condensed vapor, will contain 10% to 20% of dissolved protein, and it will be well not to go beyond the extreme figure in order to facilitate the filtration.

At the end of the time indicated above (4 to 6 hours in the total) the heating will be interrupted and while gently agitating, one will add a weight of adsorbing charcoal of about 0.5% to 2% of the weight of the protein, according to the intensity of the odor to be made to disappear.

The filtration can follow after 10 to 15 minutes of contact and it will be best accomplished by the use of a steam or air pressure filter through a layer of glass wool, cellulose wool, by incorporating, if necessary, a little cellulose powder or in fine fibers or liquid in order to warp the pores of the filtrant and to hold back the fine particles of charcoal.

For the phosphatation there will be added to the clear broth $n$ kilogs of syrupy 75% strength phosphoric acid, diluted previously in 3 to 5 times its weight of water. The liquid will then be neutralized by approximately $(n-2)$ kilogs of calcium carbonate, pulverized or precipitated, the exact weight being fixed by analysis of the liquid and calculated so as to form the phosphate $PO_4CaH$.

The value of $n$ is not fixed in an imperative manner, as it depends upon the exigencies of the customers but it generally varies from the twentieth to the quintuple of the weight of the dissolved protein.

It is the protein milk and phosphorcalcic content which, kept homogeneous by agitating, is finally sent to the vacuum evaporators. The dry product will be preserved by protection against humidity.

As indicated above, a food product with a protein base having phosphate and calcium can be prepared by hydrolyzing certain natural substances contained in skin and bones, deodorizing and decolorizing the hydrolyzed liquid broth with charcoal, filtering and removing the charcoal, and adding phosphate and calcium. The hydrolysis is preferably accomplished by heating the raw materials with milk of lime which also saponifies the fat and leaves a product which is purer and easier to preserve. The broth retained and fortified with phosphoric acid and lime is then evaporated in vacuum.

As a modification of the above process, the food qualities of the product are considerably improved by making the hydrolysis in a less alkaline medium. Instead of pH=10, which value was approximately realized in the boiling of the milk of lime, there is substituted a medium stopped at pH 9.5. This value precedes the threshold of hydrolysis of the sulphureted functions and the threshold of breakage of the peptic chain which accompanies a tautomerization, with change of optical sign, of certain amino-acids to the detriment of their food value.

This result is attained by using magnesia in the place of lime. The raw materials will therefore to advantage be degreased first by soaking in a milk of lime the temperature of which should not be above 30°-40° C. After prolonged washing to eliminate the greater part of the lime they will be heated as in the hereinbefore described example with water, to which has been added magnesia in a dose of about ⅕ to ½ of the lime of the said example, because it will be of advantage to equally incorporate basic carbonate of magnesia in quantity sufficient to transform integrally into carbonate the lime which might remain from the first operation.

One can also perform the degreasing and hydrolysis at one time by directly heating the raw materials as indicated hereinabove with water containing mixed lime produced from the calcination of natural dolomite. The lime which it contains will produce the saponification of the greases and the magnesia remaining less basic will effectuate the hydrolysis obtained and the putting into solution of the protein materials.

The magnesia remaining in solution will be precipitated by means of phosphoric acid or carbonic acid at the time of filtration already described and which follows the de-coloration and the de-odorization with active carbon. The succession of the operations will be according to the process and example previously described.

I claim:

1. In a process of treating protein-containing skins, bones, tannery refuse and the like to form an edible food composition, the step of hydrolyzing the protein-containing material with an aqueous solution containing at least one of the reagents magnesia and basic carbonate of magnesia, said solution having an alkalinity not greater than pH 9.5, whereby the food value of amino-acids is preserved without breaking peptide linkages which breaking accompanies tautomerization.

2. The process of producing an edible deodorized food product from protein-containing skins, bones, tannery refuse and the like which comprises treating the material under hydrolyzing conditions with an alkaline solution having a pH value not higher than 9.5 produced from an aqueous mixture of magnesia and basic magnesium carbonate, deodorizing the hydrolyzed solution with adsorbent charcoal precipitating soluble magnesium compounds, filtering the solution, acidifying the deodorized solution with phosphoric acid, neutralizing the excess phosphoric acid with calcium carbonate to form calcium phosphate, and evaporating the solution of hydrolyzed protein containing the calcium phosphate to dryness under vacuum conditions.

3. The process set forth in claim 2 in which calcined dolomite is utilized in the hydrolyzing solution to provide mixed calcium and magnesium compounds.

4. The process of producing an edible deodorized food product from protein-containing skins, bones, tannery refuse and the like which comprises treating the material with an aqueous solution containing milk of lime to degrease the same, removing the greater portion of the lime by washing the degreased material, subjecting the degreased material to hydrolysis in an alkaline aqueous solution having a pH value not more alkaline than 9.5 and containing at least one of the reagents magnesia and basic carbonate of magnesia therein whereby residual lime is carbonated during the hydrolytic process, treating the hydrolyzed solution to deodorize and decolorize the same and to remove magnesium compounds therefrom, phosphating the clarified solution to form calcium phosphate therein, and evaporating the liquid mixture to produce a dry phosphoproteinate of calcium product.

5. The process set forth in claim 4 in which degreasing and hydrolysis are simultaneously accomplished in one step by the use of calcined dolomite.

6. The process of producing an edible food product from protein-containing skins, bones, tannery refuse and the like which comprises the steps of subjecting the material to hydrolysis in an alkaline aqueous solution having a pH value not more alkaline than 9.5 and containing at least one of the reagents magnesia and basic carbonate of magnesia therein, treating the hydrolyzed solution with at least one of the reagents phosphoric acid and carbon dioxide to precipitate soluble magnesium compounds, treating the hydrolyzed solution with activated carbon to deodorize and decolorize the same, filtering the solution to remove carbon and precipitate therefrom, and evaporating the clarified liquid to yield a powdered protein product.

7. The product produced by the process set forth in claim 2.

ADOLPHE PACAULT.

REFERENCES CITED

The following references are of record in the file of this patent:

UNITED STATES PATENTS

| Number | Name | Date |
| --- | --- | --- |
| 1,442,339 | Hildebrandt | Jan. 16, 1923 |
| 2,051,017 | Schwartz et al. | Aug. 11, 1936 |
| 2,095,638 | Jeffreys | Oct. 12, 1937 |
| 2,184,494 | Glass | Dec. 26, 1939 |
| 2,256,914 | Whitcomb | Sept. 23, 1941 |
| 2,338,415 | Downey et al. | Jan. 4, 1944 |
| 2,413,815 | Epstein | Jan. 7, 1947 |

FOREIGN PATENTS

| Number | Country | Date |
| --- | --- | --- |
| 378,399 | Great Britain | of 1931 |